(12) United States Patent
Hayashi et al.

(10) Patent No.: US 10,867,754 B2
(45) Date of Patent: Dec. 15, 2020

(54) ELECTROCHEMICAL DEVICE

(71) Applicant: Panasonic Intellectual Property Management Co., Ltd., Osaka (JP)

(72) Inventors: Hiroki Hayashi, Kyoto (JP); Susumu Nomoto, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 90 days.

(21) Appl. No.: 16/334,979

(22) PCT Filed: Sep. 28, 2017

(86) PCT No.: PCT/JP2017/035091
§ 371 (c)(1),
(2) Date: Mar. 20, 2019

(87) PCT Pub. No.: WO2018/062337
PCT Pub. Date: Apr. 5, 2018

(65) Prior Publication Data
US 2020/0020487 A1    Jan. 16, 2020

(30) Foreign Application Priority Data
Sep. 30, 2016 (JP) .................. 2016-195084

(51) Int. Cl.
*H01G 11/06* (2013.01)
*H01G 11/60* (2013.01)
(Continued)

(52) U.S. Cl.
CPC ........... *H01G 11/06* (2013.01); *H01G 11/60* (2013.01); *H01G 11/62* (2013.01);
(Continued)

(58) Field of Classification Search
CPC ........ H01G 11/06; H01G 11/60; H01G 11/62; H01G 9/15; H01G 9/0032; H01G 9/028;
(Continued)

(56) References Cited

U.S. PATENT DOCUMENTS

2012/0320497 A1* 12/2012 Ehrenberg ............. H01G 11/32
361/525
2014/0030559 A1* 1/2014 Yazami ................... H01M 4/60
429/50

FOREIGN PATENT DOCUMENTS

JP          1-146255          6/1989
JP          2014-035836       2/2014

OTHER PUBLICATIONS

International Search Report of PCT application No. PCT/JP2017/035091 dated Nov. 28, 2017.

* cited by examiner

*Primary Examiner* — Michael P McFadden
(74) *Attorney, Agent, or Firm* — McDermott Will & Emery LLP

(57) ABSTRACT

According to the present invention, an electrochemical device includes: a positive electrode containing, as a positive electrode active material, a conductive polymer that is to be doped and dedoped with anions, a negative electrode containing a negative electrode active material that occludes and releases lithium ions, and an electrolytic solution containing anions and lithium ions. In a charged state of the electrochemical device, an amount A (mol) of anions that are doped into the conductive polymer and are contained in the positive electrode and an amount B (mol) of the anions contained in the electrolytic solution satisfy a relational expression: $1.1 \leq B/A \leq 2.8$.

12 Claims, 3 Drawing Sheets

(51) Int. Cl.
*H01G 11/62* (2013.01)
*H01M 4/04* (2006.01)
*H01M 10/0568* (2010.01)
*H01M 10/0569* (2010.01)
*H01M 4/02* (2006.01)

(52) U.S. Cl.
CPC ..... *H01M 4/0466* (2013.01); *H01M 10/0568* (2013.01); *H01M 10/0569* (2013.01); *H01M 2004/027* (2013.01); *H01M 2004/028* (2013.01); *H01M 2300/0051* (2013.01)

(58) Field of Classification Search
CPC .......... H01G 9/04; H01G 9/07; H01G 9/0036; H01M 4/0466; H01M 10/0568; H01M 10/0569; H01M 2004/027; H01M 2004/028; H01M 2300/0051
See application file for complete search history.

ELECTROCHEMICAL DEVICE

CROSS-REFERENCE TO RELATED APPLICATIONS

This application is a U.S. national stage application of the PCT International Application No. PCT/JP2017/035091 filed on Sep. 28, 2017, which claims the benefit of foreign priority of Japanese patent application 2016-195084 filed on Sep. 30, 2016, the contents all of which are incorporated herein by reference.

TECHNICAL FIELD

The present invention relates to an electrochemical device including a positive electrode containing, as a positive electrode active material, a conductive polymer that is to be doped and dedoped with anions and a negative electrode containing a negative electrode active material that occludes and releases lithium ions.

BACKGROUND

In recent years, electrochemical devices having a property intermediate between a lithium ion secondary battery and an electric double layer capacitor attract attention. For example, it is studied that a conductive polymer is used as a positive electrode active material. Since electrochemical devices are charged and discharged by adsorption (doping) and desorption (dedoping) of anions in a positive electrode containing a conductive polymer, such positive electrode has small reaction resistance. Hence, such positive electrode has higher output than a positive electrode of a general lithium ion secondary battery does. As conductive polymers, polyaniline, polypyrrole and the like are known (see Unexamined Japanese Patent Publication No. 1-146255 and Unexamined Japanese Patent Publication No. 2014-35836).

SUMMARY

In the electrochemical device, the amount of anions contained in each of the positive electrode and the electrolytic solution changes during charging and discharging. For this reason, it is required to maintain a good balance between the amount of anions in the positive electrode and the amount of anions in the electrolytic solution so that anions from the electrolytic solution are sufficiently doped into the conductive polymer during charging. This issue, however, has still not been sufficiently studied. Hence, anions from the electrolytic solution are not sufficiently doped into the conductive polymer during charging, and thus the discharge capacity actually obtained is still low compared to the theoretical capacity of the conductive polymer.

In view of the above, an electrochemical device according to an aspect of the present invention includes a positive electrode, a negative electrode, and an electrolytic solution. The positive electrode includes, as a positive electrode active material, a conductive polymer that is to be doped and dedoped with anions. The negative electrode includes a negative electrode active material that occludes and releases lithium ions. The electrolytic solution contains anions and lithium ions. In a charged state of the electrochemical device, an amount A (mol) of anions that are doped into the conductive polymer and are contained in the positive electrode and an amount B (mol) of the anions contained in the electrolytic solution satisfy a relational expression: $1.1 \leq B/A \leq 2.8$.

An electrochemical device according to another aspect of the present invention includes a positive electrode, a negative electrode, and an electrolytic solution. The positive electrode includes, as a positive electrode active material, a conductive polymer that is to be doped and dedoped with anions. The negative electrode includes a negative electrode active material that occludes and releases lithium ions. The electrolytic solution contains anions and lithium ions. An amount C (mol) of the anions contained in the electrolytic solution in a discharged state of the electrochemical device and an amount D (mol) of the anions contained in the electrolytic solution in a charged state of the electrochemical device satisfy a relational expression: $1.1 \leq D/(C-D) \leq 2.8$.

An electrochemical device according to yet another aspect of the present invention includes a positive electrode, a negative electrode, and an electrolytic solution. The positive electrode includes, as a positive electrode active material, a conductive polymer that is to be doped and dedoped with anions. The negative electrode includes a negative electrode active material that occludes and releases lithium ions. The electrolytic solution contains anions and lithium ions. In the electrochemical device, a total amount E (mol) of monomer units that constitute the conductive polymer and are contained in the positive electrode and a total amount F (mol) of anions contained in the electrochemical device satisfy a relational expression: $0.7 \leq F/E \leq 1.3$.

According to the present invention, in an electrochemical device including a positive electrode containing, as a positive electrode active material, a conductive polymer that is to be doped and dedoped with anions and a negative electrode containing a negative electrode active material that occludes and releases lithium ions, anions are sufficiently doped into the conductive polymer during charging. Accordingly, excellent discharge characteristics can be obtained.

DESCRIPTION OF EMBODIMENTS

Figure 1:
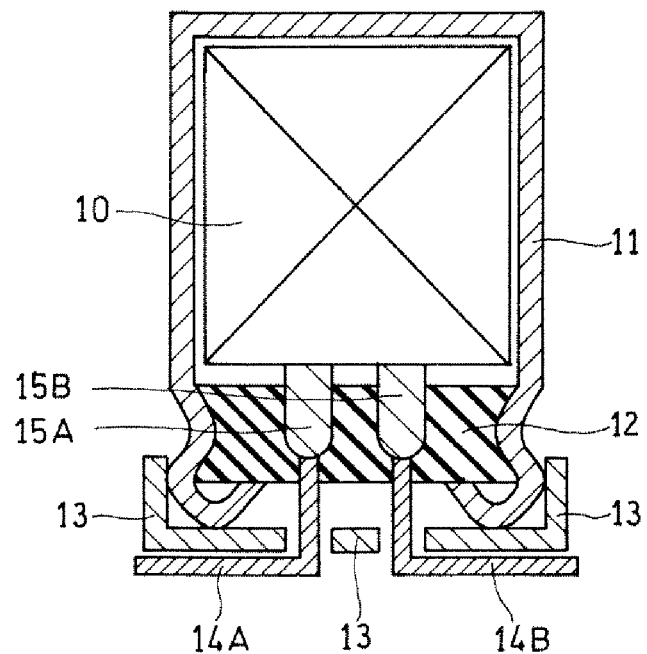
FIG. 1 is a schematic cross-sectional view illustrating an electrochemical device according to an exemplary embodiment.

The present invention relates to an electrochemical device including: a positive electrode containing, as a positive electrode active material, a conductive polymer that is to be doped and dedoped with anions as a positive electrode material, a negative electrode containing a negative electrode active material that occludes and releases lithium ions, and an electrolytic solution containing anions and lithium ions. During charging, anions in the electrolytic solution are doped into the conductive polymer, and lithium ions in the electrolytic solution are occluded in a negative electrode material. During discharging, anions dedoped from the conductive polymer move into the electrolytic solution, and lithium ions released from the negative electrode material move into the electrolytic solution. The present invention includes cases where the conductive polymer exhibits almost no conductivity or no conductivity at all in a state where anions have been dedoped from the conductive polymer.

In the electrochemical device according to a first exemplary embodiment, in a charged state of the electrochemical device, an amount A (mol) of anions that are doped into the conductive polymer and are contained in the positive electrode and an amount B (mol) of the anions contained in the electrolytic solution satisfy a relational expression: $1.1 \leq B/A \leq 2.8$.

When B/A is within the above-mentioned range, anions are sufficiently doped into the conductive polymer during charging, and the anions are efficiently dedoped from the conductive polymer during discharging, so that a high discharge capacity (capacity density) can be obtained.

If B/A is less than 1.1, the amount of anions contained in the electrolytic solution is small, and the conductive polymer cannot be sufficiently doped with anions from the electrolytic solution during charging, so that the discharge capacity is low.

If B/A exceeds 2.8, the anion concentration in the electrolytic solution is high and the viscosity of the electrolytic solution increases, and thus the electrolytic solution cannot sufficiently enter into pores of a porous film of the conductive polymer, so that the discharge capacity is low. If the amount of solvent in the electrolytic solution is increased to suppress the increase of the anion concentration, it is disadvantageous in terms of miniaturization of the electrochemical device.

In the electrochemical device according to a second exemplary embodiment, an amount C (mol) of the anions contained in the electrolytic solution in a discharged state of the electrochemical device and an amount D (mol) of the anions contained in the electrolytic solution in a charged state of the electrochemical device satisfy a relational expression: $1.1 \leq D/(C-D) \leq 2.8$.

When D/(C−D) is within the above-mentioned range, anions are sufficiently doped into the conductive polymer during charging, and the anions are efficiently dedoped from the conductive polymer during discharging, so that a high discharge capacity (capacity density) can be obtained.

If D/(C−D) is less than 1.1, the amount of anions contained in the electrolytic solution is small, and the conductive polymer cannot be sufficiently doped with anions from the electrolytic solution during charging, so that the discharge capacity is low.

If D/(C−D) exceeds 2.8, the anion concentration in the electrolytic solution is high and the viscosity of the electrolytic solution increases, and thus the electrolytic solution cannot sufficiently enter into pores of a porous film of the conductive polymer, so that the discharge capacity is low. If the amount of solvent in the electrolytic solution is increased to suppress the increase of the anion concentration, it is disadvantageous in terms of miniaturization of the electrochemical device.

Here, the "charged state" refers to a case where the SOC (state of charge) of the electrochemical device ranges from 90% to 100%, inclusive. The "discharged state" refers to a case where the SOC of the electrochemical device ranges from 0% to 10%, inclusive. The "SOC (state of charge)" refers to the percentage of the amount of charge with respect to the capacitance at full charge.

The discharged state where the SOC ranges from 0% to 10% is a state where the voltage of the electrochemical device is the end-of-discharge voltage, and the charged state where the SOC ranges from 90% to 100% is a state where the voltage of the electrochemical device is the end-of-charge voltage. The end-of-discharge voltage and the end-of-charge voltage as well as charge and discharge conditions are determined by a manufacturer. In general, these conditions can be unambiguously determined according to the charge/discharge circuit and product information provided by the manufacturer.

When a π-conjugated polymer is used as the conductive polymer and a carbon material is used as the negative electrode active material, the end-of-charge voltage is set to, for example, a range from 3.4 V to 4.2 V, and the end-of-discharge voltage is generally set to a range from 2.5 V to 2.6 V. When a t-conjugated polymer is used as the conductive polymer and lithium titanate is used as the negative electrode active material, the end-of-charge voltage is generally set to a range from 2.4 V to 2.5 V, and the end-of-discharge voltage is generally set to a range from 1.1 V to 1.2 V.

In the electrochemical device according to a third exemplary embodiment, a total amount E (mol) of monomer units that constitute the conductive polymer and are contained in the positive electrode and a total amount F (mol) of anions contained in the electrochemical device satisfy a relational expression: $0.7 \leq F/E \leq 1.3$.

When F/E is within the above-mentioned range, anions are sufficiently doped into the conductive polymer during charging, and the anions are efficiently dedoped from the conductive polymer during discharging, so that a high discharge capacity (capacity density) can be obtained.

If F/E is less than 0.7, the amount of anions contained in the electrolytic solution is small, and the conductive polymer cannot be sufficiently doped with anions from the electrolytic solution during charging, so that the discharge capacity is low.

If F/E exceeds 1.3, the anion concentration in the electrolytic solution is high and the viscosity of the electrolytic solution increases, and thus the electrolytic solution cannot sufficiently enter into pores of a porous film of the conductive polymer, so that the discharge capacity is low. If the amount of solvent in the electrolytic solution is increased to suppress the increase of the anion concentration, it is disadvantageous in terms of miniaturization of the electrochemical device.

In order to improve the discharge characteristics, it is preferable that the conductive polymer have at least one anion accepting site per monomer unit that constitutes the conductive polymer. Here, the "anion accepting site" means a site at which the conductive polymer is theoretically capable of accepting (capable of being doped with) anions during charging from the viewpoint of the molecular structure of the conductive polymer. For example, polyaniline having aniline as a repeating monomer unit logically has one anion accepting site per aniline monomer unit.

The conductive polymer is desirably a t-conjugated polymer having a repeating unit containing a heteroatom. Heteroatoms (such as a nitrogen atom and a sulfur atom) of a t-conjugated polymer tend to interact with anions. It is considered that anions are adsorbed onto or desorbed from heteroatoms during oxidation and reduction of the conductive polymer induced by charging and discharging.

Examples of the π-electron conjugated polymer include homopolymers and/or copolymers of at least one polymerizable compound selected from the group consisting of aniline, pyrrole, thiophene, furan, thiophene vinylene, pyridine, and derivatives thereof. That is, as the n-electron conjugated polymer, it is possible to use a homopolymer containing a monomer unit derived from the polymerizable compound, or a copolymer containing monomer units derived from two or more of the polymerizable compounds. More specifically, it is possible to use polyaniline, polypyrrole, polythiophene, polyfuran, polythiophene vinylene, polypyridine, a polymer derivative containing any of these compounds as a basic skeleton, and the like obtained. The polymer derivative is a polymer of a derivative compound such as an aniline derivative, a pyrrole derivative, a thiophene derivative, a furan derivative, a thiophene vinylene derivative, and a pyridine derivative. An example of the polymer derivative is poly(3,4-ethylenedioxythiophene) (PEDOT) containing polythiophene as a basic skeleton. Among them, polyaniline is preferable for the n-electron conjugated polymer since a high capacity density is obtained.

The weight-average molecular weight of the conductive polymer is not particularly limited, but it ranges, for example, from 1000 to 100000, inclusive.

Examples of the anion with which the conductive polymer is to be doped and dedoped in association with charging and discharging include $ClO_4^-$, $BF_4^-$, $PF_6^-$, $AlCl_4^-$, $SbF_6^-$, $SCN^-$, $F_3SO_3^-$, $FSO_3^-$, $CF_3CO_2^-$, $A_8F_6^-$, $B_{10}Cl_{10}^-$, $Cl^-$, $Br^-$, $I^-$, $BCl_4^-$, $N(FSO_2)_2^-$, and $N(CF_3SO_2)_2^-$. In particular, an oxoacid anion containing a halogen atom, an imide anion and the like are preferable. The oxoacid anion containing a halogen atom is preferably a tetrafluoroborate anion ($BF_4^-$), a hexafluorophosphate anion ($PF_6^-$), a perchlorate anion ($ClO_4^-$), a fluorosulfate anion ($FSO_3^-$) or the like. Among them, $PF_6^-$ is more preferable since the conductive polymer is easily reversibly doped and dedoped with the anion. $PF_6^-$ may account for 90 mol % or more of all the anions contained in the electrolytic solution in the charged state and the discharged state. The imide anion is preferably a bis(fluorosulfonyl)imide anion ($N(FSO_2)_2^-$). These anions may be used alone or in combination of two or more thereof.

As the charging progresses, the anions in the electrolytic solution are doped into the conductive polymer, and the anion concentration in the electrolytic solution decreases. Therefore, it is preferable to adjust the amount of anions in the electrolytic solution so that the amount of anions supplied from the electrolytic solution to the conductive polymer during charging may not be insufficient. In order that the conductive polymer may be sufficiently doped with anions during charging, for example, the amount of anions contained in the electrolytic solution is adjusted so that the anion concentration in the electrolytic solution in the charged state (the SOC is 90% to 100%) is 0.5 mol/L or more.

On the other hand, the anion concentration in the electrolytic solution increases during discharging. Therefore, it is preferable to adjust the amount of anions in the electrolytic solution so that the viscosity of the electrolytic solution may not increase during discharging to deteriorate the discharge characteristics. For example, the amount of anions contained in the electrolytic solution is adjusted so that the anion concentration in the electrolytic solution in the discharged state (the SOC is 0% to 10%) is less than or equal to 2.5 mol/L.

In the following, each constituent of the electrochemical device will be described in more detail.

(Positive Electrode)

The positive electrode has, for example, a positive electrode material layer containing, as a positive electrode active material, the above-mentioned conductive polymer. The positive electrode material layer is generally supported on a positive current collector. For example, a conductive sheet material is used for the positive current collector. As the sheet material, metal foil, porous metal, perforated metal or the like is used. The material of the positive current collector may be aluminum, an aluminum alloy, nickel, titanium or the like.

The positive electrode material layer may further contain, in addition to the positive electrode active material, a conductive agent and a binder. Examples of the conductive agent include carbon black and carbon fibers. Examples of the binder include a fluororesin, an acrylic resin, a rubber material, and a cellulose derivative.

The conductive polymer contained in the positive electrode material layer is synthesized by polymerizing a polymerizable compound (monomer) that is a raw material of the conductive polymer. The synthesis of the conductive polymer may be carried out either by electrolytic polymerization or by chemical polymerization. For example, it is possible to form a film of the conductive polymer (positive electrode material layer) so as to cover at least part of a surface of the positive current collector by following procedure. The procedure includes: preparing a conductive sheet material (for example, a metal foil piece) as the positive current collector; immersing the positive current collector and a counter electrode in a monomer solution; and applying an electric current between the positive current collector as an anode and the counter electrode. The monomer solution may contain, as a dopant, anions exemplified above, or anions other than the anions exemplified above, such as a sulfate ion and a nitrate ion. It is also possible to add an oxidizing agent for promoting electrolytic polymerization.

(Negative Electrode)

The negative electrode has, for example, a negative electrode material layer containing a negative electrode active material. The negative electrode material layer is generally supported on a negative current collector. For the negative current collector, for example, a conductive sheet material is used. As the sheet material, metal foil, porous metal, perforated metal or the like is used. The material of the negative current collector may be copper, a copper alloy, nickel, stainless steel or the like.

Examples of the negative electrode active material include carbon materials, metal compounds, alloys, and ceramic materials. The carbon material is preferably graphite, hardly graphitizable carbon (hard carbon) or easily graphitizable carbon (soft carbon), particularly preferably graphite or hard carbon. Examples of the metal compound include silicon oxide and tin oxide. Examples of the alloy include silicon alloys and tin alloys. Examples of the ceramic material include lithium titanate and lithium manganate. These materials may be used alone or in combination of two or more thereof. In particular, the carbon material is preferable from the viewpoint that the material is capable of lowering the potential of the negative electrode.

The negative electrode material layer desirably contains, in addition to the negative electrode active material, a conductive agent, a binder and the like. For the conductive agent and the binder, those mentioned as examples for the positive electrode material layer can be used.

The negative electrode is desirably pre-doped with lithium ions in advance. Thus, the potential of the negative electrode is lowered, and the potential difference (that is, the voltage) between the positive electrode and the negative electrode increases, so that the energy density of the electrochemical device is improved.

Pre-doping of lithium ions into the negative electrode advances, for example, by the following manner. A metal lithium layer serving as a lithium ion supply source is formed on a surface of the negative electrode material layer, lithium ions elute from the metal lithium layer into the electrolytic solution, and the eluted lithium ions are occluded in the negative electrode active material. For example, when graphite or hard carbon is used as the negative electrode active material, lithium ions are inserted between layers of graphite or into pores of hard carbon. The amount of lithium ions to be pre-doped can be controlled by the mass of the metal lithium layer.

The negative electrode material layer of the negative electrode is formed by preparing a negative electrode mixture paste that is a mixture of a negative electrode active material, a conductive agent, a binder and the like with a dispersion medium, and applying the negative electrode mixture paste to the negative current collector, for example.

The step of pre-doping lithium ions into the negative electrode may be performed before an electrode group is assembled, or the pre-doping may be advanced after an electrode group together with the electrolytic solution is put into a case of the electrochemical device.

(Electrolytic Solution)

The electrolytic solution (nonaqueous electrolytic solution) contains a solvent (nonaqueous solvent) and a lithium salt soluble in a solvent. The lithium salt contains anions that are doped into the conductive polymer during charging, and lithium ions that are occluded in the negative electrode active material during charging.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. These lithium salts may be used alone or in combination of two or more thereof. In particular, it is preferable to use at least one lithium salt selected from the group consisting of lithium salts having an oxoacid anion containing a halogen atom and lithium salts having an imide anion.

The concentration of the lithium salt in the electrolytic solution in the charged state (the SOC is 90% to 100%) ranges, for example, from 0.2 mol/L to 3 mol/L, inclusive.

Examples of the usable solvent include cyclic carbonates such as ethylene carbonate, propylene carbonate (PC), and butylene carbonate, chain carbonates such as dimethyl carbonate (DMC), diethyl carbonate, and ethyl methyl carbonate, aliphatic carboxylic acid esters such as methyl formate, methyl acetate, methyl propionate, and ethyl propionate, lactones such as γ-butyrolactone and γ-valerolactone, chain ethers such as 1,2-dimethoxyethane (DME), 1,2-diethoxyethane (DEE), and ethoxymethoxyethane (EME), cyclic ethers such as tetrahydrofuran and 2-methyltetrahydrofuran, dimethylsulfoxide, 1,3-dioxolane, formamide, acetamide, dimethylformamide, dioxolane, acetonitrile, propionitrile, nitromethane, ethyl monoglyme, trimethoxymethane, sulfolane, methylsulfolane, and 1,3-propanesultone. These solvents may be used alone or in combination of two or more thereof. In particular, a mixed solvent containing DMC and PC is preferable from the viewpoint of ion conductivity. It is preferable that DMC and PC account for 50% by mass or more, more preferably 80% by mass or more of the solvent. In this case, the volume ratio between DMC and PC (DMC/PC) may range, for example, from 30/70 to 70/30, inclusive.

Additives may be added to the solvent in the electrolytic solution, if necessary. For example, an unsaturated carbonate such as vinylene carbonate, vinylethylene carbonate, or divinylethylene carbonate may be added as an additive for forming a film with high lithium ion conductivity on the negative electrode surface.

(Separator)

It is preferable to interpose a separator between the positive electrode and the negative electrode. Examples of the usable separator include nonwoven fabrics made of cellulose fibers, nonwoven fabrics made of glass fibers, microporous films made of polyolefin, woven fabrics, and nonwoven fabrics. The thickness of the separator ranges, for example, from 10 μm to 300 μm, inclusive, preferably from 10 μm to 40 μm, inclusive.

An electrochemical device according to an exemplary embodiment of the present invention will be described with reference to FIGS. 1 and 2.

Figure 2:
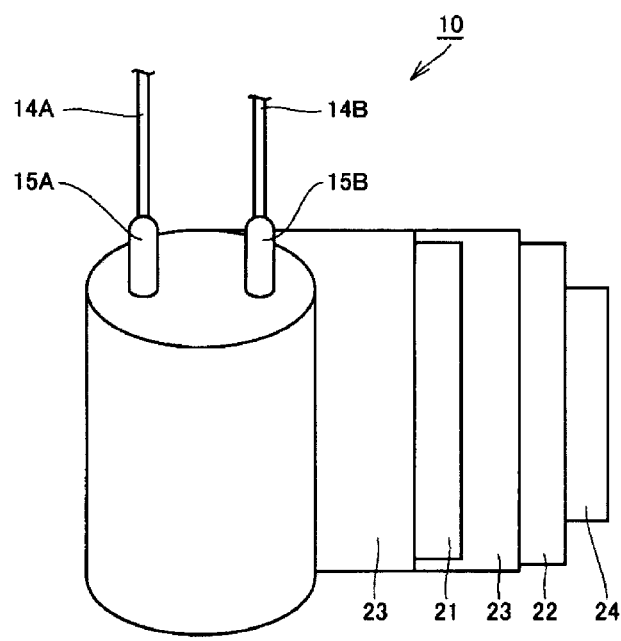
FIG. 2 is a schematic view for illustrating a structure of the electrochemical device according to the exemplary embodiment.

Electrode group 10 is a wound body as shown in FIG. 2, and includes positive electrode 21, negative electrode 22, and separator 23 disposed between positive electrode 21 and negative electrode 22. The outermost periphery of the wound body is fixed by winding stop tape 24. Positive electrode 21 is connected to lead tab 15A, and negative electrode 22 is connected to lead tab 15B. The electrochemical device includes electrode group 10, bottomed case 11 that houses electrode group 10, sealing body 12 that closes an opening of bottomed case 11, lead wires 14A, 14B that are led out from sealing body 12, and electrolytic solution (not shown). Lead wires 14A, 14B are connected to lead tabs 15A, 15B, respectively. Sealing body 12 is formed of, for example, an elastic material containing a rubber component. Bottomed case 11 is drawn to the inside at the vicinity of an opening end thereof, and the opening end is curled so as to be caulked with sealing body 12.

In the above-mentioned embodiment, a cylindrical electrochemical device including a wound electrode group has been described. However, it is also possible to form a rectangular electrochemical device including an electrode group that includes a laminate of a positive electrode and a negative electrode with a separator interposed between both the electrodes.

EXAMPLES

Hereinafter, the present invention will be described in more detail with reference to examples, but the present invention is not limited to the examples.

(1) Production of Positive Electrode

An aluminum foil piece having a thickness of 30 μm was prepared as a positive current collector. Meanwhile, an aniline aqueous solution containing aniline and sulfuric acid was prepared.

The positive current collector and a counter electrode were immersed in the aniline aqueous solution, and subjected to electrolytic polymerization at a current density of 10 mA/cm$^2$ for 20 minutes. As a result, a film of a conductive polymer (polyaniline) doped with sulfate ions ($SO_4^{2-}$) as a dopant for the conductive polymer was deposited onto entire front and back surfaces of the positive current collector.

The conductive polymer doped with sulfate ions was reduced to dedope the doped sulfate ions. In this way, a porous conductive polymer film (positive electrode material layer) from which sulfate ions had been dedoped was formed. The thickness of the conductive polymer film was 60 μm per one surface of the positive current collector. The conductive polymer film was thoroughly washed and then dried. By adjusting the dedoping amount of sulfate ions as a dopant for the conductive polymer, the amount of anions doped into and dedoped from the conductive polymer in association with charging and discharging, as well as the amount of anions contained in the electrolytic solution during charging and discharging can be adjusted.

(2) Production of Negative Electrode

A copper foil piece having a thickness of 20 μm was prepared as a negative current collector. Meanwhile, a carbon paste was prepared by kneading a mixed powder with water at a weight ratio of 40:60. The mixed powder contains 97 parts by mass of hard carbon, 1 part by mass of carboxycellulose, and 2 parts by mass of styrene butadiene rubber. The carbon paste was applied to both surfaces of the negative current collector and dried. As a result, a negative electrode having a negative electrode material layer, which has a thickness of 35 μm, on each surface was produced. Then, a metal lithium layer was formed on the negative electrode material layer. An amount of the metal lithium layer was calculated so that the negative electrode potential in the electrolytic solution after completion of the pre-doping was less than or equal to 0.2 V with respect to metal lithium.

(3) Production of Electrode Group

A lead tab was connected to each of the positive electrode and the negative electrode. Then, as shown in FIG. 2, a laminate obtained by alternately laminating cellulose non-woven fabric separators (each having a thickness of 35 μm) with a positive electrode and a negative electrode was wound up to form an electrode group.

(4) Preparation of Electrolytic Solution

To a mixture of propylene carbonate and dimethyl carbonate in a volume ratio of 1:1, 0.2% by mass of vinylene carbonate was added to prepare a solvent. $LiPF_6$ as a lithium salt was dissolved in the obtained solvent at a predetermined concentration to prepare an electrolytic solution containing hexafluorophosphate ions ($PF_6^-$) as anions.

(5) Production of Electrochemical Device

The electrode group and the electrolytic solution were put into a bottomed case having an opening to assemble an electrochemical device as shown in FIG. 1. Then, the electrochemical device was aged at 25° C. for 24 hours while a charging voltage of 3.8 V was applied between terminals of the positive electrode and the negative electrode to advance the pre-doping of the lithium ions into the negative electrode.

In the production of the electrochemical device, while the amount of electrolytic solution contained in the case was kept constant, the lithium salt concentration in the electrolytic solution contained in the case was varied to produce test cells Nos. 1 to 18 each having a B/A value shown in Table 1, test cells Nos. 19 to 33 each having a D/(C−D) value shown in Table 2, and test cells Nos. 34 to 53 each having an F/E value shown in Table 3.

Note that in Table 1, Nos. 5 to 16 are examples, and Nos. 1 to 4 and 17 to 18 are comparative examples. In Table 2, Nos. 22 to 32 are examples, and Nos. 19 to 21 and 33 are comparative examples. In Table 3, Nos. 36 to 51 are examples, and Nos. 34 to 35 and 52 to 53 are comparative examples.

TABLE 1

| Cell No. | B/A | Discharge capacity (mAh/g) |
|---|---|---|
| 1 | 0.65 | 80.1 |
| 2 | 0.75 | 88.4 |
| 3 | 0.86 | 93.4 |
| 4 | 0.99 | 108.0 |
| 5 | 1.11 | 113.4 |
| 6 | 1.24 | 121.4 |
| 7 | 1.28 | 120.5 |

TABLE 1-continued

| Cell No. | B/A | Discharge capacity (mAh/g) |
|---|---|---|
| 8 | 1.43 | 121.0 |
| 9 | 1.46 | 122.7 |
| 10 | 1.55 | 123.9 |
| 11 | 1.75 | 123.9 |
| 12 | 1.84 | 123.3 |
| 13 | 2.07 | 120.0 |
| 14 | 2.15 | 118.9 |
| 15 | 2.60 | 120.5 |
| 16 | 2.70 | 119.0 |
| 17 | 2.90 | 99.6 |
| 18 | 3.06 | 92.3 |

TABLE 2

| Cell No. | D/(C − D) | Discharge capacity (mAh/g) |
|---|---|---|
| 19 | 0.69 | 80.9 |
| 20 | 0.72 | 85.2 |
| 21 | 0.75 | 88.4 |
| 22 | 1.10 | 108.7 |
| 23 | 1.20 | 120.2 |
| 24 | 1.25 | 120.0 |
| 25 | 1.34 | 119.9 |
| 26 | 1.43 | 121.0 |
| 27 | 1.55 | 123.9 |
| 28 | 1.73 | 122.9 |
| 29 | 1.84 | 120.3 |
| 30 | 2.55 | 120.2 |
| 31 | 2.63 | 120.0 |
| 32 | 2.78 | 117.0 |
| 33 | 3.06 | 92.3 |

TABLE 3

| Cell No. | F/E | Discharge capacity (mAh/g) |
|---|---|---|
| 34 | 0.55 | 75.1 |
| 35 | 0.62 | 88.4 |
| 36 | 0.70 | 113.4 |
| 37 | 0.75 | 121.4 |
| 38 | 0.76 | 120.5 |
| 39 | 0.78 | 119.9 |
| 40 | 0.81 | 121.0 |
| 41 | 0.82 | 122.7 |
| 42 | 0.85 | 123.9 |
| 43 | 0.90 | 122.9 |
| 44 | 0.91 | 122.9 |
| 45 | 0.95 | 123.3 |
| 46 | 0.97 | 120.0 |
| 47 | 1.10 | 120.1 |
| 48 | 1.20 | 120.2 |
| 49 | 1.24 | 120.0 |
| 50 | 1.27 | 119.0 |
| 51 | 1.28 | 117.0 |
| 52 | 1.37 | 99.6 |
| 53 | 1.44 | 92.3 |

[Evaluation]

(1) Measurement of Discharge Capacity

The electrochemical devices obtained as described above were subjected to a charge/discharge test in the order of charge, pause, and discharge under the following conditions, and the discharge capacity (capacity per 1 g of the positive electrode active material) was measured.

Ambient temperature: 25° C.

Charge: 1 C charge at a constant current until the voltage reaches an end-of-charge voltage of 3.8 V Pause: 5 minutes Discharge: 1 C discharge at a constant current until the voltage reaches an end-of-discharge voltage of 2.5 V "1 C charge" means constant current charge with a quantity of electricity corresponding to the rated capacity C (unit: mAh) of the electrochemical device in 1 hour. "1 C discharge" means constant current discharge with a quantity of electricity corresponding to the rated capacity C of the electrochemical device in 1 hour.

(2) Measurement of A to F (i) Amount a (Mol) of Anions that are Doped into Conductive Polymer and are Contained in Positive Electrode and Amounts B and D (Mol) of Anions Contained in Electrolytic Solution in Charged State of Electrochemical Device The electrochemical device was charged under the same charge conditions as those in the item (1) to prepare an electrochemical device in a charged state. As for the electrochemical device, the amount A of anions contained in the positive electrode and the amounts B and D (mol) of anions contained in the electrolytic solution were measured.

The amount A of anions ($PF_6^-$) contained in the positive electrode was determined by the following procedure. That is, the electrochemical device was disassembled, the positive electrode was taken out and dried, and then the positive electrode material layer was peeled from the positive current collector. Then, the positive electrode material layer was dissolved by heating in a mixed acid (a mixture of hydrochloric acid, nitric acid, and water) and allowed to cool. The insoluble matter was removed by filtration, the solution was adjusted to a desired volume, and the P concentration was measured by ICP emission spectroscopic analysis.

The amounts B and D of anions ($PF_6^-$) contained in the electrolytic solution were obtained by using the amount of the electrolytic solution contained in the electrochemical device and the anion concentration ($PF_6^-$) in the electrolytic solution.

The amount of the electrolytic solution contained in the electrochemical device was determined by the following procedure. That is, the electrochemical device was disassembled, the electrode group containing the electrolytic solution was taken out, and the weight W1 of the electrode group before being dried was measured. Then, the electrode group was disassembled, the positive electrode, the negative electrode, and the separator were individually washed with water and dried, and the total weight W2 of the positive electrode, the negative electrode, and the separator after being dried was measured. Then, W2 was subtracted from W1 to determine the amount of the electrolytic solution.

The anion concentration in the electrolytic solution contained in the electrochemical device was determined by disassembling the electrochemical device, collecting the electrolytic solution contained in the separator, and measuring the P concentration by ICP emission spectroscopic analysis.

(ii) Amount C (Mol) of Anions Contained in Electrolytic Solution in Discharged State of Electrochemical Device The electrochemical device was charged and discharged under the same charge and discharge conditions as those in the item (1) to prepare an electrochemical device in a discharged state. The amount C (mol) of anions contained in the electrolytic solution of the electrochemical device was measured by the same method as in the item (i).

(iii) Total Amount E (Mol) of Monomer Units that Constitute Conductive Polymer and are Contained in Positive Electrode The electrochemical device was disassembled and the positive electrode was taken out, and the positive electrode material layer was peeled from the positive current collector. Then, the total number of moles of nitrogen atoms in polyaniline contained in the positive electrode material layer was determined by ICP emission spectroscopic analysis. Based on the fact that one monomer unit (aniline skeleton) contains one nitrogen atom, the total amount E (mol) of monomer units that constitute the conductive polymer in the positive electrode material layer was determined. Polyaniline logically has one anion accepting site per monomer unit (aniline skeleton).

(iv) Total Amount F (Mol) of Anions Contained in Electrochemical Device

The total amount F (mol) of anions contained in the electrochemical device was determined by adding the amount of anions ($PF_6^-$) contained in the positive electrode and the amount of anions ($PF_6^-$) contained in the electrolytic solution. The amount of anions ($PF_6^-$) contained in the positive electrode and the amount of anions ($PF_6^-$) contained in the electrolytic solution were determined in the same manner as in the above item (i).

Figure 3:
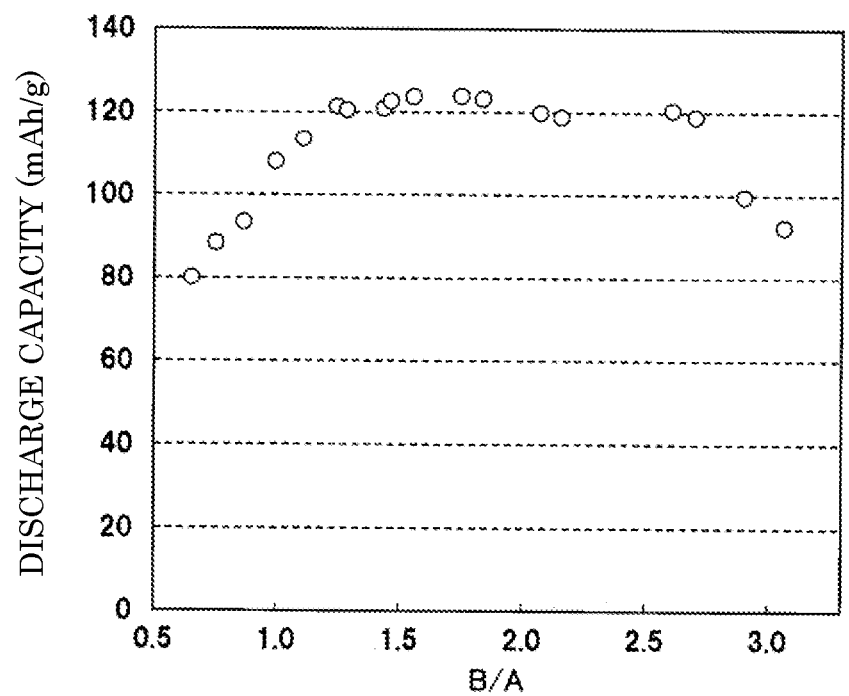
FIG. 3 is a graph showing a relation between B/A and discharge capacity in electrochemical devices according to an exemplary embodiment.
Figure 4:
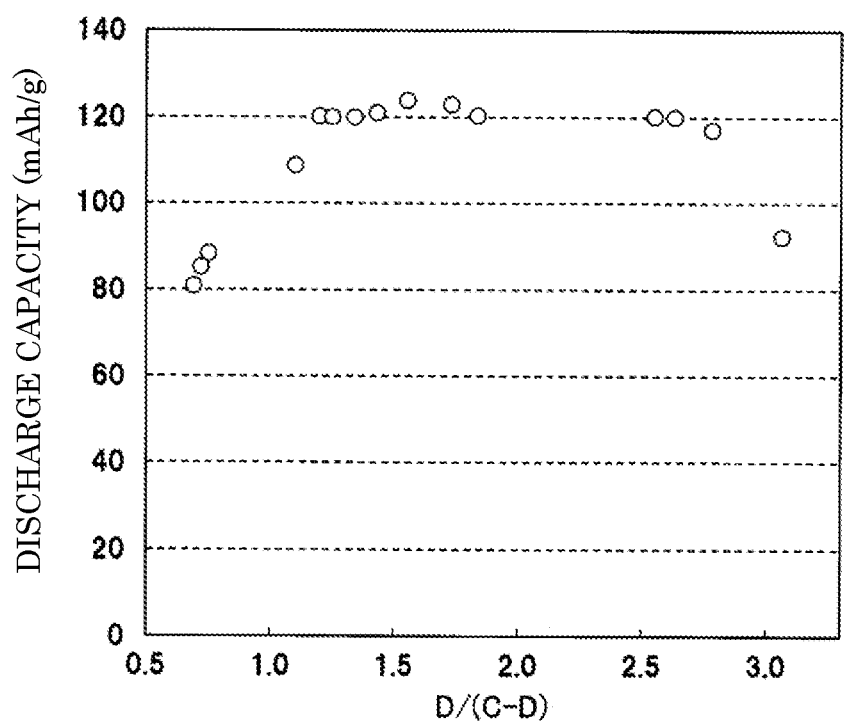
FIG. 4 is a graph showing a relation between D/(C−D) and discharge capacity in electrochemical devices according to an exemplary embodiment.
Figure 5:
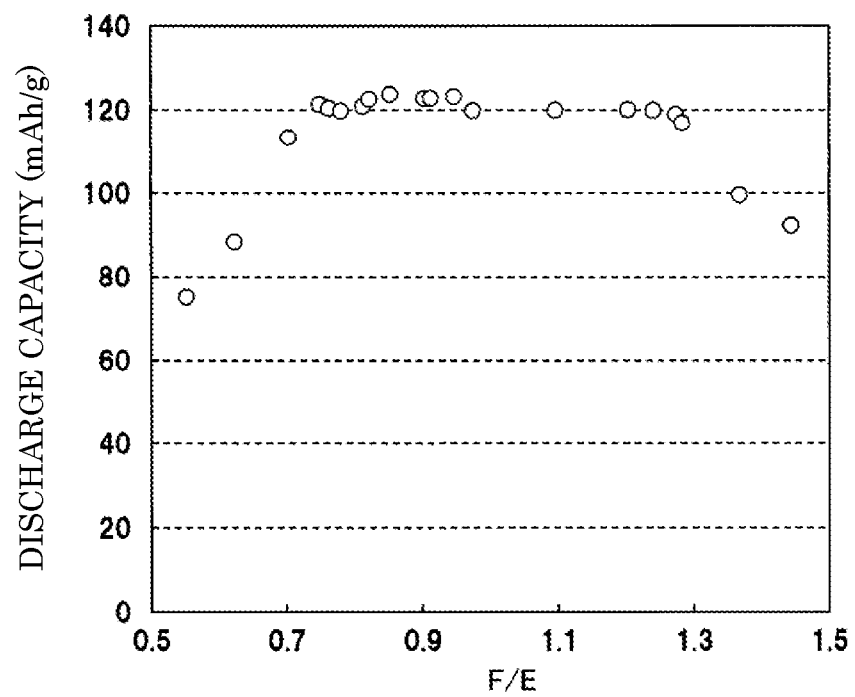
FIG. 5 is a graph showing a relation between F/E and discharge capacity in electrochemical devices according to an exemplary embodiment.

The evaluation results are shown in Tables 1 to 3 and FIGS. 3 to 5. FIG. 3 is a graph in which B/A and discharge capacity in Table 1 are plotted. FIG. 4 is a graph in which D/(C D) and discharge capacity in Table 2 are plotted. FIG. 5 is a graph in which F/E and discharge capacity in Table 3 are plotted.

In the test cells Nos. 5 to 16 in which B/A was 1.1 to 2.8, test cells Nos. 22 to 32 in which D/(C–D) was 1.1 to 2.8, and test cells Nos. 36 to 51 in which F/E was 0.7 to 1.3, all of which were test cells of examples of the present invention, a high discharge capacity was obtained since anions were sufficiently doped into the conductive polymer during charging.

In the test cells Nos. 1 to 4 in which B/A was less than 1.1, test cells Nos. 19 to 21 in which D/(C–D) was less than 1.1, and test cells Nos. 34 to 35 in which F/E was less than 0.7, all of which were test cells of comparative examples, the discharge capacity was low since anions were not sufficiently doped into the conductive polymer during charging.

In the test cells Nos. 17 to 18 in which B/A was more than 2.8, test cell No. 33 in which D/(C–D) was more than 2.8, and test cells Nos. 52 to 53 in which F/E was more than 1.3, all of which were test cells of comparative examples, the anion concentration in the electrolytic solution was high and the viscosity of the electrolytic solution increased, and thus the discharge capacity was low.

The electrochemical device according to the present invention has higher capacity than electric double layer capacitors and lithium ion capacitors do, and can be suitably applied to uses in which higher power is required than in lithium ion secondary batteries.

The invention claimed is:

1. An electrochemical device comprising:
  a positive electrode including, as a positive electrode active material, a conductive polymer that is to be doped and dedoped with anions;
  a negative electrode including a negative electrode active material that occludes and releases lithium ions; and
  an electrolytic solution containing anions and lithium ions,
  wherein, in a charged state of the electrochemical device, a following relational expression is satisfied:

$1.1 \leq B/A \leq 2.8$ wherein A is an amount (mol) of anions that are doped into the conductive polymer and are contained in the positive electrode, and B is an amount (mol) of the anions contained in the electrolytic solution.

2. The electrochemical device according to claim 1, wherein the conductive polymer is polyaniline.

3. The electrochemical device according to claim 1, wherein the anions include $PF_6$.

4. The electrochemical device according to claim 1, wherein the electrolytic solution contains dimethyl carbonate and propylene carbonate as solvents.

5. An electrochemical device comprising:
a positive electrode including, as a positive electrode active material, a conductive polymer that is to be doped and dedoped with anions;
a negative electrode including a negative electrode active material that occludes and releases lithium ions; and
an electrolytic solution containing anions and lithium ions,
wherein a following relational expression is satisfied:

$1.1 \leq D/(C-D) \leq 2.8$ wherein C is an amount (mol) of the anions contained in the electrolytic solution in a discharged state of the electrochemical device, and D is an amount (mol) of the anions contained in the electrolytic solution in a charged state of the electrochemical device.

6. The electrochemical device according to claim 5, wherein the conductive polymer is polyaniline.

7. The electrochemical device according to claim 5, wherein the anions include $PF_6$.

8. The electrochemical device according to claim 5, wherein the electrolytic solution contains dimethyl carbonate and propylene carbonate as solvents.

9. An electrochemical device comprising:
a positive electrode including, as a positive electrode active material, a conductive polymer that is to be doped and dedoped with anions;
a negative electrode including a negative electrode active material that occludes and releases lithium ions; and
an electrolytic solution containing anions and lithium ions,
wherein a following relational expression is satisfied:

$0.7 \leq F/E \leq 1.3$ wherein E is a total amount (mol) of monomer units that constitute the conductive polymer and are contained in the positive electrode, and F is a total amount (mol) of anions contained in the electrochemical device.

10. The electrochemical device according to claim 9, wherein the conductive polymer is polyaniline.

11. The electrochemical device according to claim 9, wherein the anions include $PF_6$.

12. The electrochemical device according to claim 9, wherein the electrolytic solution contains dimethyl carbonate and propylene carbonate as solvents.

* * * * *